(12) United States Patent
Maskaliunas (10) Patent No.: US 10,550,941 B2
(45) Date of Patent: Feb. 4, 2020

(54) RADIAL FLUID SEAL

(71) Applicant: Aktiebolaget SKF, Gothenburg (SE)

(72) Inventor: Linas Maskaliunas, Geneva, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/640,974

(22) Filed: Jul. 3, 2017

(65) Prior Publication Data

US 2019/0003595 A1 Jan. 3, 2019

(51) Int. Cl.
*F16J 15/3232* (2016.01)
*F16J 15/3284* (2016.01)
*F16J 15/3208* (2016.01)
*F16C 33/72* (2006.01)

(52) U.S. Cl.
CPC ....... *F16J 15/3232* (2013.01); *F16J 15/3208* (2013.01); *F16J 15/3284* (2013.01); *F16C 33/72* (2013.01)

(58) Field of Classification Search
CPC .. F16J 15/3232; F16J 15/3236; F16J 15/3284; F16J 15/3208; F16C 33/72
See application file for complete search history.

(56) References Cited

U.S. PATENT DOCUMENTS

| | | | | |
|---|---|---|---|---|
| 4,448,426 A * | 5/1984 | Jackowski | ........... | F16J 15/3256 277/353 |
| 5,201,528 A * | 4/1993 | Upper | ................. | F16J 15/3256 277/394 |
| 7,594,664 B2 * | 9/2009 | Maskaliunas | .......... | F16J 15/322 277/551 |
| 8,439,363 B2 * | 5/2013 | Greca | ................. | F16J 15/3456 277/353 |
| 8,734,022 B2 * | 5/2014 | Dittmar | ............... | F16C 33/7813 384/480 |
| 8,820,751 B2 * | 9/2014 | Denton | ................ | F16J 15/3268 277/576 |
| 9,103,446 B2 | 8/2015 | Maskaliunas | | |
| 9,163,730 B2 | 10/2015 | Maskaliunas et al. | | |
| 2007/0222161 A1 * | 9/2007 | Voydatch | ............... | F16J 15/164 277/551 |
| 2010/0038864 A1 * | 2/2010 | Kuzumaki | .......... | F16C 33/7876 277/560 |
| 2010/0201078 A1 * | 8/2010 | Kuzumaki | .......... | F16C 33/7823 277/560 |
| 2012/0126490 A1 * | 5/2012 | Maskaliunas | ............ | F16J 15/48 277/572 |

(Continued)

OTHER PUBLICATIONS

Scotseal Plus XL brochure, Publication 457952, rev. Sep. 2016 US.

*Primary Examiner* — Eugene G Byrd
(74) *Attorney, Agent, or Firm* — J-Tek Law PLLC; Jeffrey D. Tekanic; Scott T. Wakeman (57) ABSTRACT

A seal body includes a flange that supports a lip configured to make sliding contact with a fixed surface. The flange includes a groove for receiving a garter spring on one face, and inwardly and outwardly facing conical surfaces on the opposite surface, the conical surfaces defining a lip where they meet. The ratio of the thickness of the portion of the lip located to one side of a plane that includes an edge of the groove to the thickness of the portion of the lip on the other side of the plane is about 44%.

18 Claims, 6 Drawing Sheets

(56) References Cited

U.S. PATENT DOCUMENTS

| | | | |
|---|---|---|---|
| 2014/0054864 A1* | 2/2014 | Kohl | F16J 15/32 277/549 |
| 2015/0247533 A1* | 9/2015 | Fickert-Guenther | F16C 33/7823 384/480 |
| 2016/0215824 A1* | 7/2016 | Gezault | F16J 15/3204 |
| 2018/0031128 A1* | 2/2018 | Pecak | F16J 15/3232 |

* cited by examiner

RADIAL FLUID SEAL

TECHNICAL FIELD

The present invention is directed to a radial fluid seal, preferably for retaining lubricant in and around a bearing, such as a wheel bearing for a truck or other heavy-duty commercial vehicle.

BACKGROUND

Radial shaft seals are used in the vehicle field to protect wheel bearings by providing a barrier between a rotatable wheel hub and a stationary wheel spindle or shaft. Such wheel bearings require continuous lubrication to reduce friction during operation.

The Scotseal® Plus XL wheel shaft seal, available from SKF USA, Inc. for several years, has been successfully employed as a radial fluid seal for heavy duty applications, such as trucks and buses. In addition to retaining lubricant around the wheel bearings, it also effectively prevents contamination, such as dirt and water, from reaching the wheel bearings.

Figure 1:
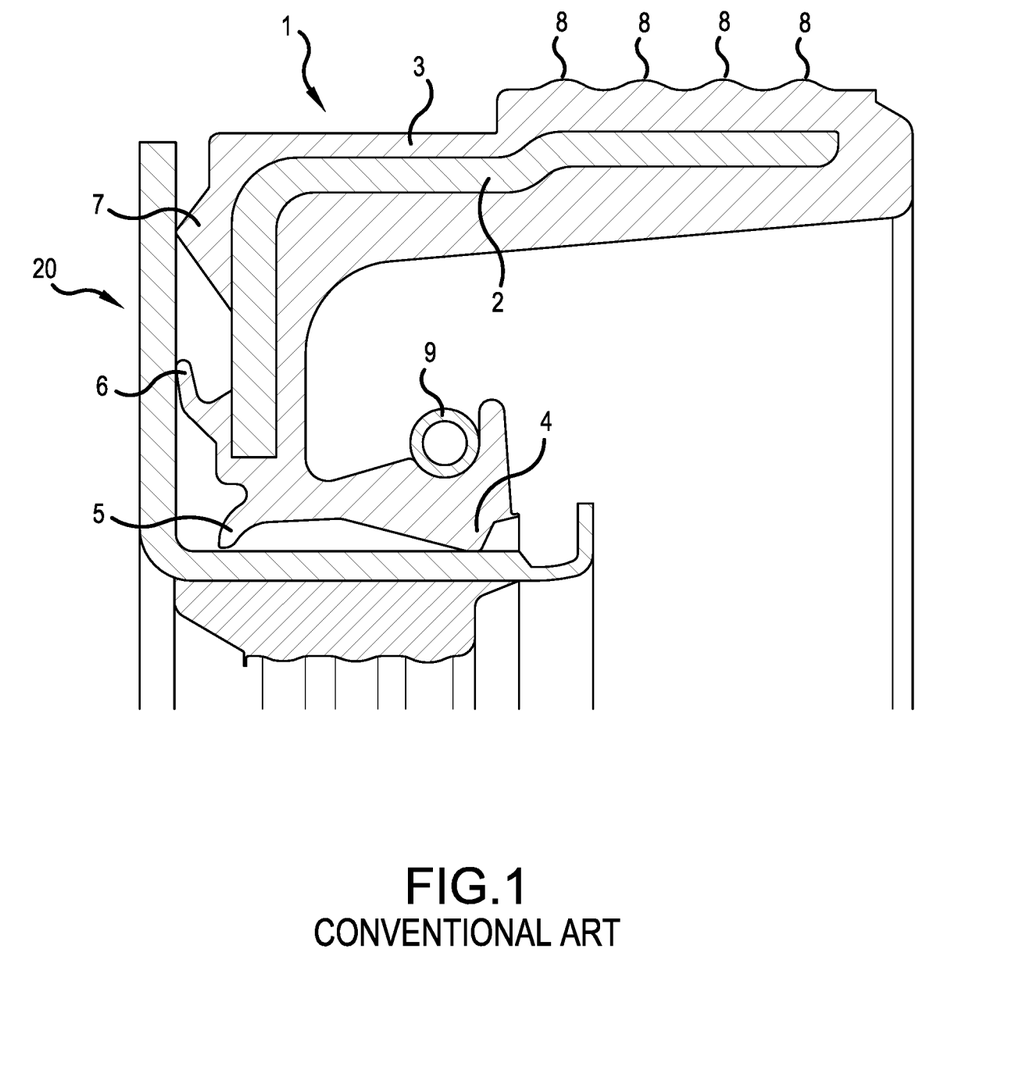
FIG. 1 is a sectional view of a conventional seal assembly.

An example of the known Scotseal® Plus XL is shown in FIG. 1, and it includes two basic annular components, the outer shell or case 1 and the inner shell or sleeve 20.

The outer shell 1 includes a substantially L-shaped metal reinforcement 2 and an elastomeric sealing element 3 made of a hydrogenated nitrile butadiene rubber (HNBR), preferably a rubber satisfying the ASTM D2000 callout M3DH810 A26 B16 EO16 EO36. The elastomeric sealing element 3 includes a primary seal lip 4, a radial dust/dirt lip 5, an annular dust/dirt lip 6 and an outer bump lip 7, all of which are elastic and contact a surface of the metal sleeve 20 during operation. The primary seal lip 4 serves to retain the lubricant around the wheel bearings (not illustrated, but located to the right of the lip 4 in FIG. 1) and the other three lips 5, 6 and 7 serve to prevent contamination from entering into the lubrication chamber (sealed region). A plurality of annular beads 8 are defined on the outside diameter (outside circumferential surface) of the elastomeric sealing element 3 for sealingly abutting against an adjacent surface of the wheel hub.

A garter (annular coiled wire) spring 9 serves to radially-inwardly bias or load the primary seal lip 4 into sealing contact with the metal sleeve 20.

The primary seal lip 4 has a Wave® seal lip construction, which reduces friction and thus heat generation while also serving to pump the lubricant back towards the wheel bearings and push dirt away from the lubrication chamber. For this purpose, the primary seal lip is a smooth lip, bi-rotational, hydrodynamic radial lip seal formed in a sinusoidal or wave pattern. This design also reduces shaft wear and increases service life, while not losing pumping power as it wears.

While the Scotseal® Plus XL performs in a satisfactory manner, new vehicle designs have become more aerodynamic, and this has decreased the volume of ambient air that flows past the seal during use (on a truck or a bus, for example). In addition, it is becoming increasingly common to use less lubricant inside the volume enclosed by the seal, and this leaves less lubricant available to lubricate the interface between the seal and the sleeve. The combination of reduced cooling air and reduced lubrication causes seals to operate at higher temperatures than in the past, and these higher operating temperatures degrade the HBNR seal material from more quickly than when the seals operated at lower temperatures.

SUMMARY

It is therefore an aspect of the present disclosure to provide a seal that is configured to operate at a lower temperature than known seals in order to prevent premature seal degradation and failure caused by high temperature operation.

In one aspect, the present disclosure comprises a seal body that has an elastomeric body and a support at least partially embedded in the elastomeric body. The elastomeric body includes a substantially cylindrical first portion having an axial inner end and an axial outer end, and a first flange and a second flange. The first flange has a radially outer end at the axial outer end of the first portion and has a radially inner end, and has an axially inner wall portion extending radially outwardly from the radially inner end of the first flange. The first flange extends radially inward from the axial outer end of the first portion. The second flange has an axial outer end at the radial inner end of the first flange and an axially inner end axially inside the first portion. The support includes a substantially cylindrical first portion that is at least partially embedded in the first portion of the elastomeric body and a second portion that is at least partially embedded in the first flange of the elastomeric body. The second flange includes radially outer wall having an annular groove configured to receive a garter spring and an radially inner surface. The radially inner surface comprises an axially outer conical portion having a radially outer end and a radially inner end and an axially inner conical portion, and the axially outer conical portion meets the axially inner conical portion at a lip which is configured to form a sliding seal with an adjacent surface. In radial section, the seal body includes a first virtual plane including the radially outer wall of the second flange, a second virtual plane parallel to the first virtual plane and including the lip, a third virtual plane parallel to the second virtual plane touching but not intersecting the groove, and a fourth virtual plane including the axially inner wall portion. In addition, a flex thickness is defined as a minimum distance from the first virtual plane to the third virtual plane and a head thickness is defined as a maximum distance from the second virtual plane to the third virtual plane and an inner angle is defined between the axially inner conical portion and the second virtual plane and an outer angle is defined between the axially outer conical portion and the second virtual plane and a head height is defined as a minimum radial distance from the fourth virtual plane to the lip. Furthermore, a ratio of the flex thickness to the head thickness is about 44%, or, alternatively, a ratio of the head thickness to the head height is about 46%.

Another aspect of the disclosure, the present disclosure comprises a seal body that has an elastomeric body and a support at least partially embedded in the elastomeric body. The elastomeric body includes a substantially cylindrical first portion having an axial inner end and an axial outer end, and a first flange and a second flange. The first flange has a radially outer end at the axial outer end of the first portion and has a radially inner end, and has an axially inner wall portion extending radially outwardly from the radially inner end of the first flange. The first flange extends radially inward from the axial outer end of the first portion. The second flange has an axial outer end at the radial inner end of the first flange and an axially inner end axially inside the first portion. The support includes a substantially cylindrical first portion that is at least partially embedded in the first portion of the elastomeric body and a second portion that is at least partially embedded in the first flange of the elastomeric body. The second flange includes radially outer wall having an annular groove configured to receive a garter spring and an radially inner surface. The radially inner surface comprises an axially outer conical portion having a radially outer end and a radially inner end and an axially inner conical portion, and the axially outer conical portion meets the axially inner conical portion at a lip which is configured to form a sliding seal with an adjacent surface. In radial section, the seal body includes a first virtual plane including the radially outer wall of the second flange, a second virtual plane parallel to the first virtual plane and including the lip, a third virtual plane parallel to the second virtual plane touching but not intersecting the groove, and a fourth virtual plane including the axially inner wall portion. In addition, a flex thickness is defined as a minimum distance from the first virtual plane to the third virtual plane and a head thickness is defined as a maximum distance from the second virtual plane to the third virtual plane and an inner angle is defined between the axially inner conical portion and the second virtual plane and an outer angle is defined between the axially outer conical portion and the second virtual plane and a head height is defined as a minimum radial distance from the fourth virtual plane to the lip. The fourth virtual plane intersects the radially outer end of the axially outer conical portion, and a ratio of the flex thickness to the head thickness is about 42% to 46%, and a ratio of the head thickness to the head height is about 44% to 48%.

BRIEF DESCRIPTION OF THE DRAWINGS

These and other aspects and features of the present disclosure will be better understood after a reading of the following detailed description together with the attached drawings, wherein.

DETAILED DESCRIPTION

Figure 2:
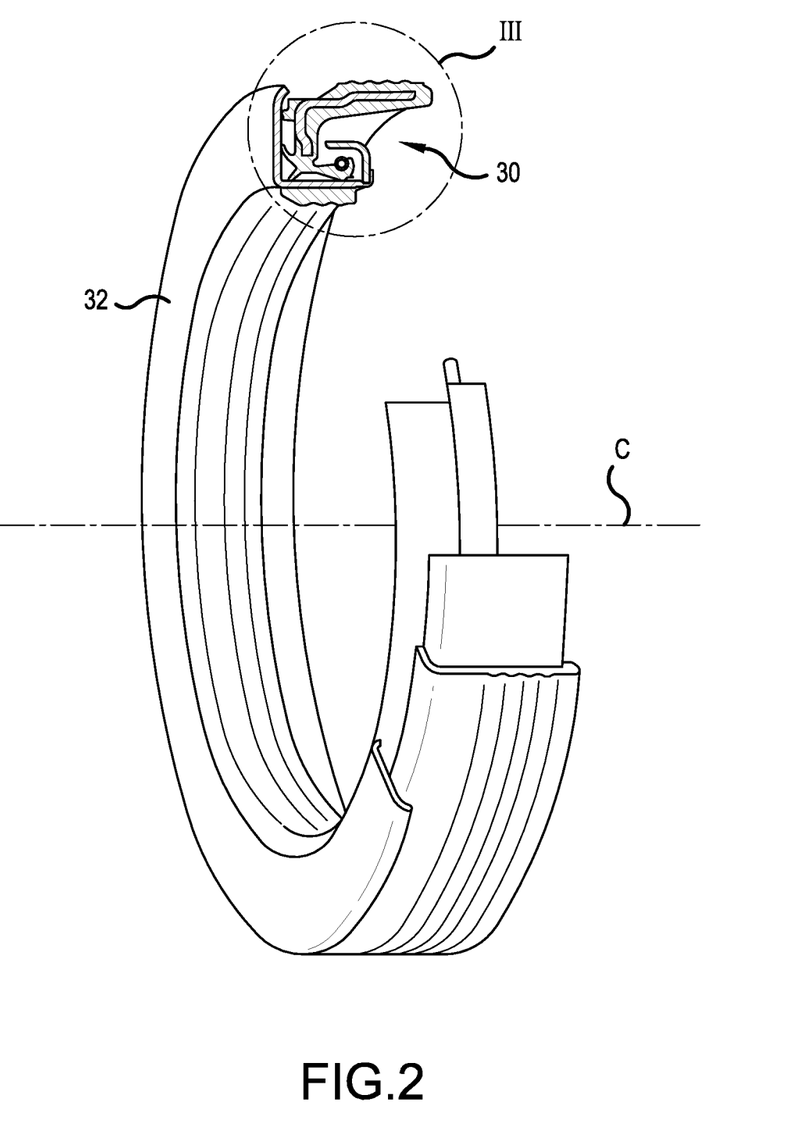
FIG. 2 is a perspective view, partly in section, of a seal assembly including a seal body according to the present disclosure, which seal body includes a first flange and a second flange.

Referring now to the drawings, wherein the showings are for purposes of illustrating a presently preferred embodiment of the disclosure only and not for the purpose of limiting same, FIG. 2 shows a seal assembly 30 configured to be mounted to a movable structure (not illustrated) and form a sliding seal with a fixed structure 32. Without limitation, the fixed structure may be a wheel hub and the rotatably structure may be a wheel assembly.

The seal assembly is configured to rotate around a central axis C, and directions described as "radially" are directions toward and away from this central axis. Furthermore, in this disclosure, the right side of the seal assembly 30 in FIG. 2 is referred to as the "inside" of the seal, that is, the side of the seal on which oil or other lubricant is retained (sometimes the "oil side" of the seal) and the left side of the seal assembly 30 is referred to as the "outside" of the seal, that is the side facing ambient air (sometimes referred to as the "air side" of the seal). The direction from inside to outside or outside to inside along the central axis C are referred to as "axial" directions. These descriptions are for convenience only and do not limit other uses of the seal where these descriptions may not apply.

Figure 3:
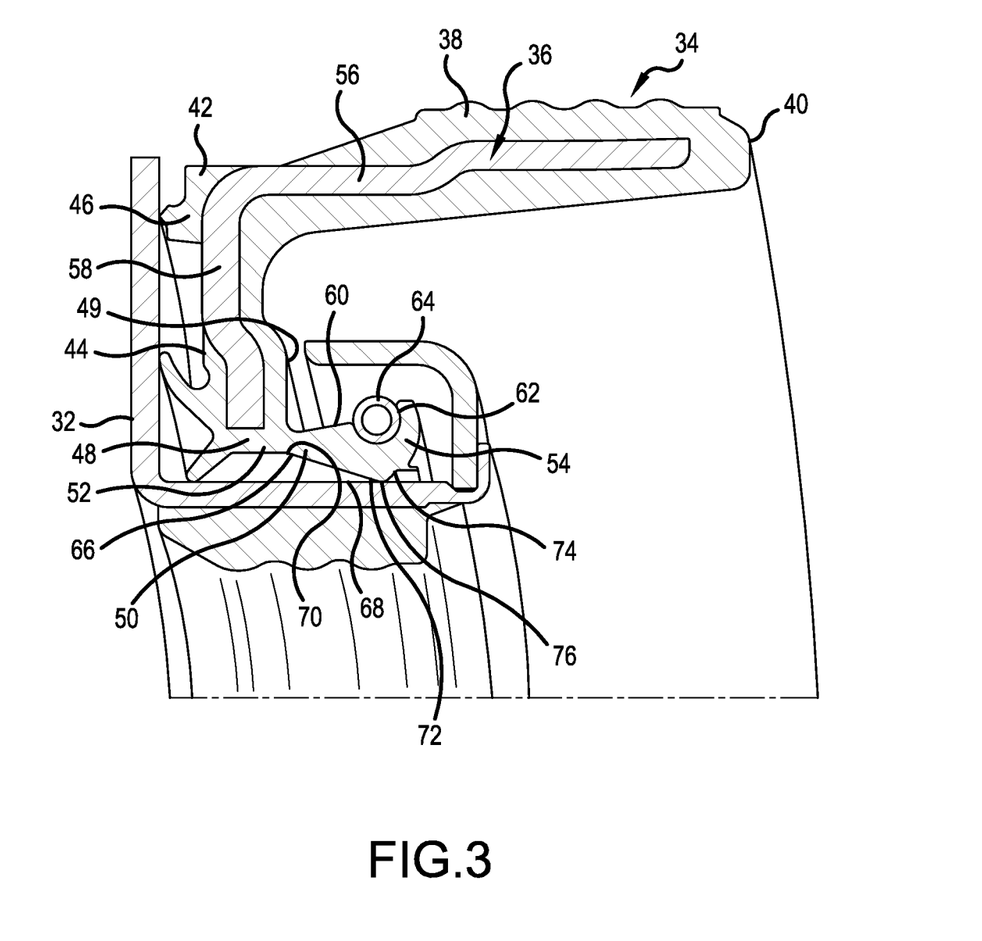
FIG. 3 is an enlarged view of region III of FIG. 2.

FIG. 3 is shows an enlarged version of a portion of the seal assembly 30 of FIG. 2. The seal assembly 30 includes an elastomeric body 34 and a support 36 at least partly embedded in the elastomeric body 34. The elastomeric body 34 includes a substantially cylindrical first portion 38 having an axial inner end 40, the an axial outer end 42. A first flange 44 has a radially outer end 46 at the axial outer end 42 of the first portion 38 and a radially inner end 48. The first flange 44 also has an axially inner wall portion 49 extending radially outwardly from the radially inner end 48 of the first flange 44. The first flange 44 extends radially inward from the axial outer end 42 of the first portion 38. The seal assembly 32 also includes a second flange 50 having an axial outer end 52 at the radial inner end 48 of the first flange 44 and an axially inner end 54 located axially inside the first portion 38.

The support 36 includes a substantially cylindrical first portion 56 at least partially embedded in the first portion 38 of the elastomeric body 34 and a second portion 58 at least partially embedded in the first flange 44 of the elastomeric body 34; however, no portion of the support 36 is embedded in the second flange 50.

The second flange 50 includes radially outer wall 60 having an annular groove 62 configured to receive a garter spring 64 and an radially inner surface 66. The radially inner surface 66 includes an axially outer conical portion 68 having a radially outer end 70 and a radially inner end 72 and an axially inner conical portion 74. The axially outer conical portion 68 meets the axially inner conical 74 portion at a lip 76, the lip 76 being configured to form a sliding seal with the fixed structure 32.

Figure 4:
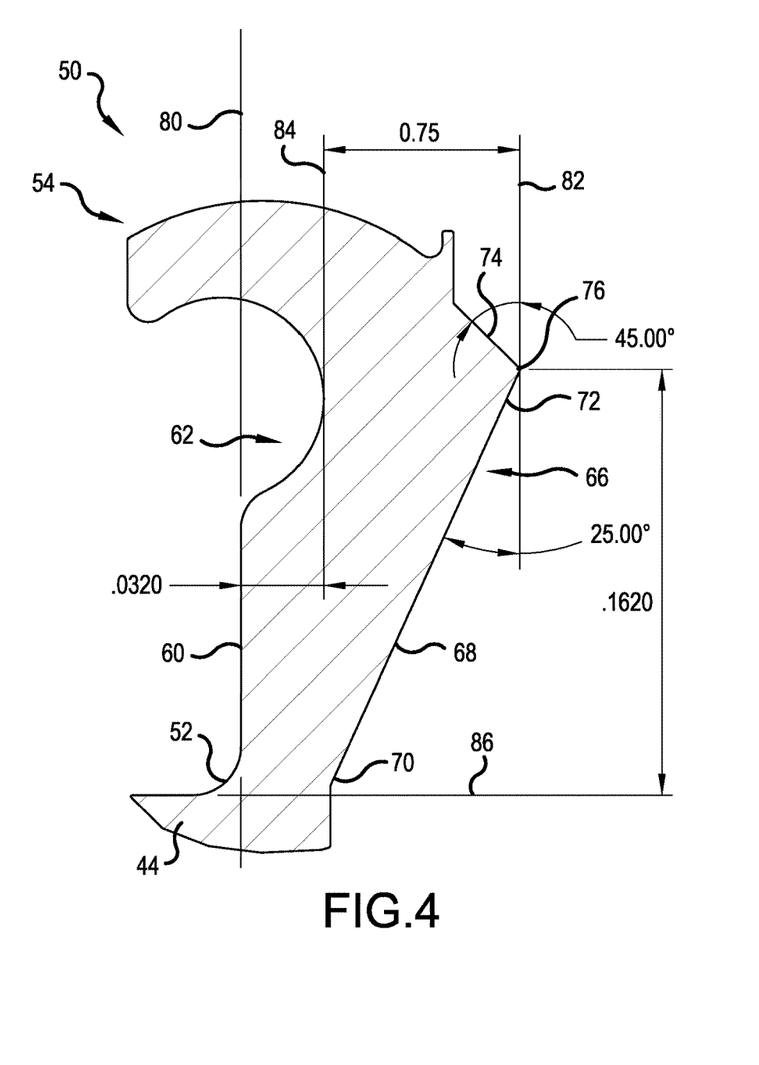
FIG. 4 is an enlarged sectional view of the second flange of the seal of FIG. 2, drawn to scale.

Several virtual, reference planes will now be defined, which virtual reference planes are illustrated in FIG. 4. It should be understood that these reference planes are not physical parts of the disclosed seal assembly but rather are used as references to define structural features of the invention. A first virtual plane 80 includes the radially outer wall 60 of the second flange 50. A second virtual plane 82 is parallel to the first virtual plane 80 and touches an exterior surface of the lip 76. A third virtual plane 84 is parallel to the first and second virtual planes and touches, but does not intersect or extend into, the groove 62. A fourth virtual plane 86 includes the axially inner wall portion 49.

The follow definitions are also used to refer to portions of the seal. A "flex thickness" is defined as a minimum distance from the first virtual plane to the third virtual plane; a "head thickness" is defined as a maximum distance from the second virtual plane to the third virtual plane; an inner angle α is defined between the axially inner conical portion 74 and the second virtual plane; an outer angle β is defined between the axially outer conical portion 68 and the second virtual plane. In addition, a head height is defined as a minimum radial distance from the fourth virtual plane to the lip 76.

FIG. 4 illustrates the second flange 50 in detail and includes the dimensions and angular measurements of various portions of the seal 30. While these dimensions are based on the application in which the seal 30 will be used, the inventors have found that the ratios of certain dimensions affect the operation of the seal. Specifically, the seal 30 will operate with lower friction, and thus at a lower temperature, when the following relationships are satisfied:

Ratio of α/β: 54% to 58%, preferably, 56%;
Ratio of flex width to head width: 42% to 46%, preferable 44%;
Ratio of flex width to head height: 18% to 22%, preferably 20%;
Ratio of head width to head height: 44% to 48%, preferably 46%.

In order to improve the pumping function of the seal, the elastomeric body of the seal assembly 30 was made from an HBNR elastomer having the ASTM D2000 callout M3DH810 A26 EO16 EO36 Z1 (Z1: Hardness Durometer 75±5 pts). In other words, the HBNR compound for the seal 30 is slightly softer than the HBNR compound used in the Scotseal XL. In addition, the compound used for the Scotseal XL seal included a carbon black filler system while compound used for the disclosed seal includes a mineral based filler system, and a person of ordinary skill in the art would expect this change to decrease friction and improve seal performance to at least some degree. However, the use of this different compound does not explain the majority of the improvements obtained with the novel, disclosed, seal configuration.

Some improvement in seal performance would be expected merely from the use of this different HBNR compound; however, the inventors expect that no more than about 20-25% of the improvements described below are attributable to the change in elastomer; the rest are believed to be due to the ratios of the structural features of the seal assembly 30 discussed above.

Figure 5:
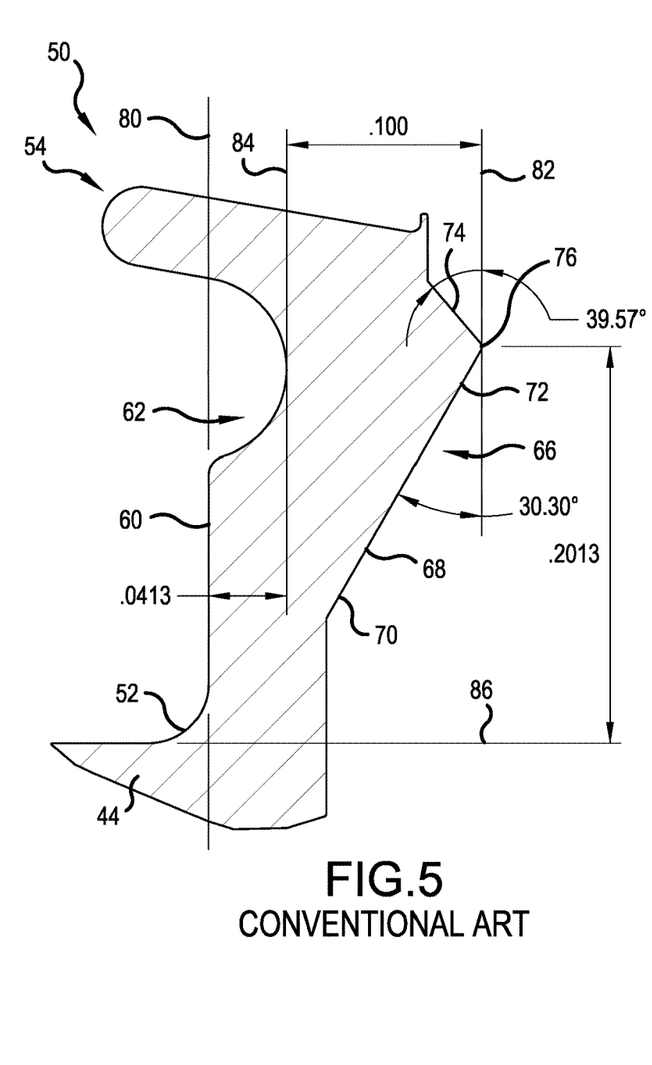
FIG. 5 is a sectional view of the second flange of the conventional seal of FIG. 1, drawn to scale.

The second flange 50 of the disclosed seal 30 is illustrated in FIG. 4, and the corresponding second flange of the conventional Scotseal XL flange is illustrated in FIG. 5 for comparison. Differences between seals having such second flanges are discussed below. For ease of comparison, elements of the novel seal illustrated in FIG. 4 and the conventional seal illustrated in FIG. 5 may be identified using identical reference numerals. This use of identical reference numerals is an indication that both the conventional seal and the novel seal have corresponding parts, lips 76, for example, but should not be taken as an assertion that any of these corresponding parts are structurally or functionally identical.

In the seal assembly 32 of FIG. 4, the radially outer end 70 of the axially outer conical portion 68 lies at the fourth reference plane 86. This differs from the conventional seal of FIG. 5 where an axial spacing exists between the radially outer end 70 of the outer conical portion 68 and the fourth reference plane 86.

In addition, the ratio of the inner angle α to the outer angle β in the novel seal assembly is about 54% to 58% and more preferably, about 56% while the corresponding ratio of the conventional seal is about 77%. The ratio of flex thickness to head thickness in the novel seal is about 44%, while the corresponding ratio in the conventional seal is about 41%. The ratio of head thickness to head height in the novel seal is about 44% to 48%, while the corresponding ratio in the conventional seal is about 50%. The inventors believe that these relationships between various portions of the novel seal are responsible for the improved seal performance described and shown in the graphs of the test results below.

To compare the performance of the novel seals of FIG. 4 and the conventional seals of FIG. 5, pairs of the seals were mounted on the four rear wheels of a tractor unit of a semi. The novel seals of FIG. 4 were mounted at the front right and rear left wheels while the conventional seals of FIG. 5 were used at the front left and rear right wheels, and the truck was operated at an average speed of about 21 mph and a maximum speed of about 43 mpg over the course of 22 days.

Figure 6:
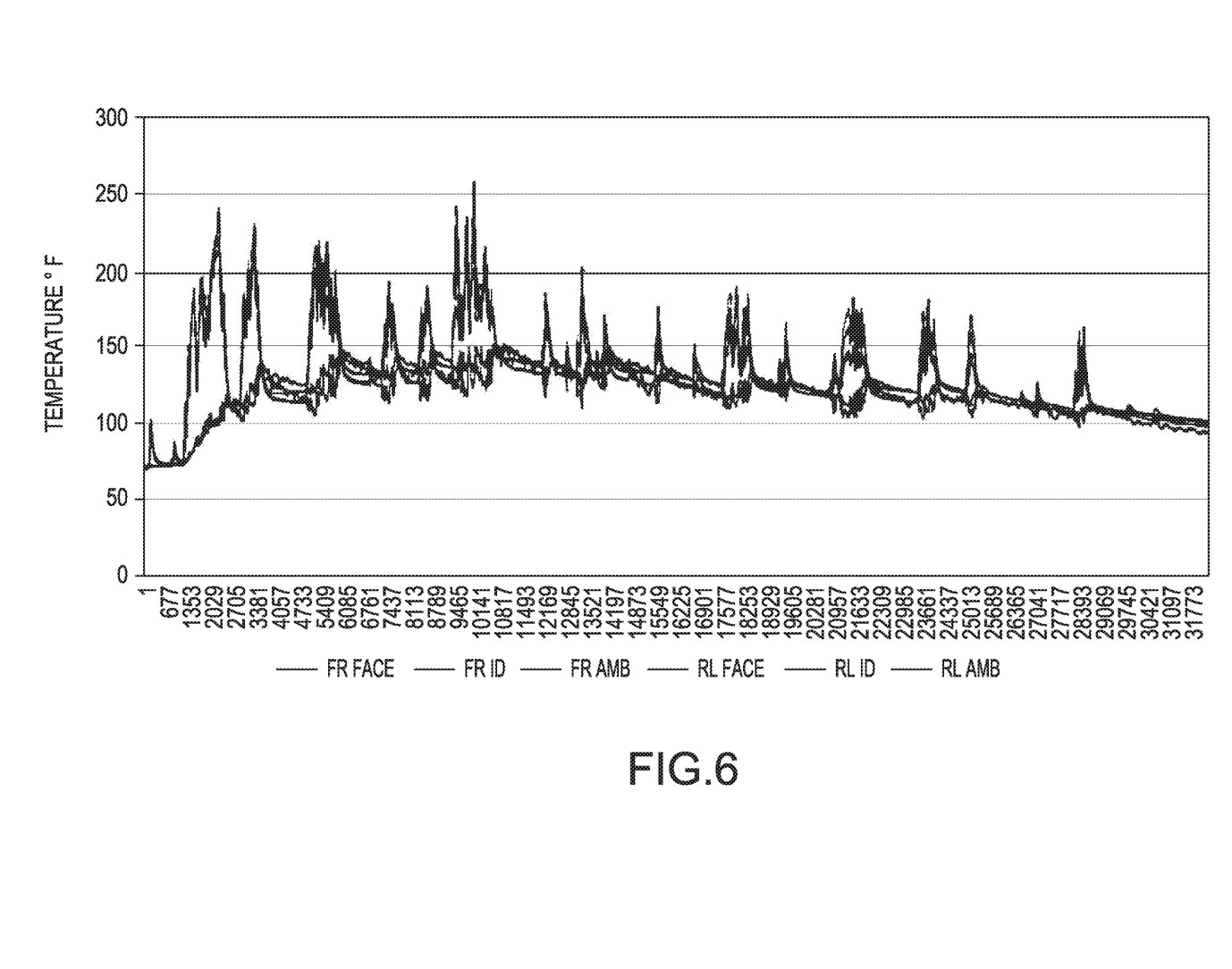
FIG. 6 is a graph showing the temperatures of various portions of the seal according to FIG. 2 mounted at front right and rear left locations on a vehicle.
Figure 7:
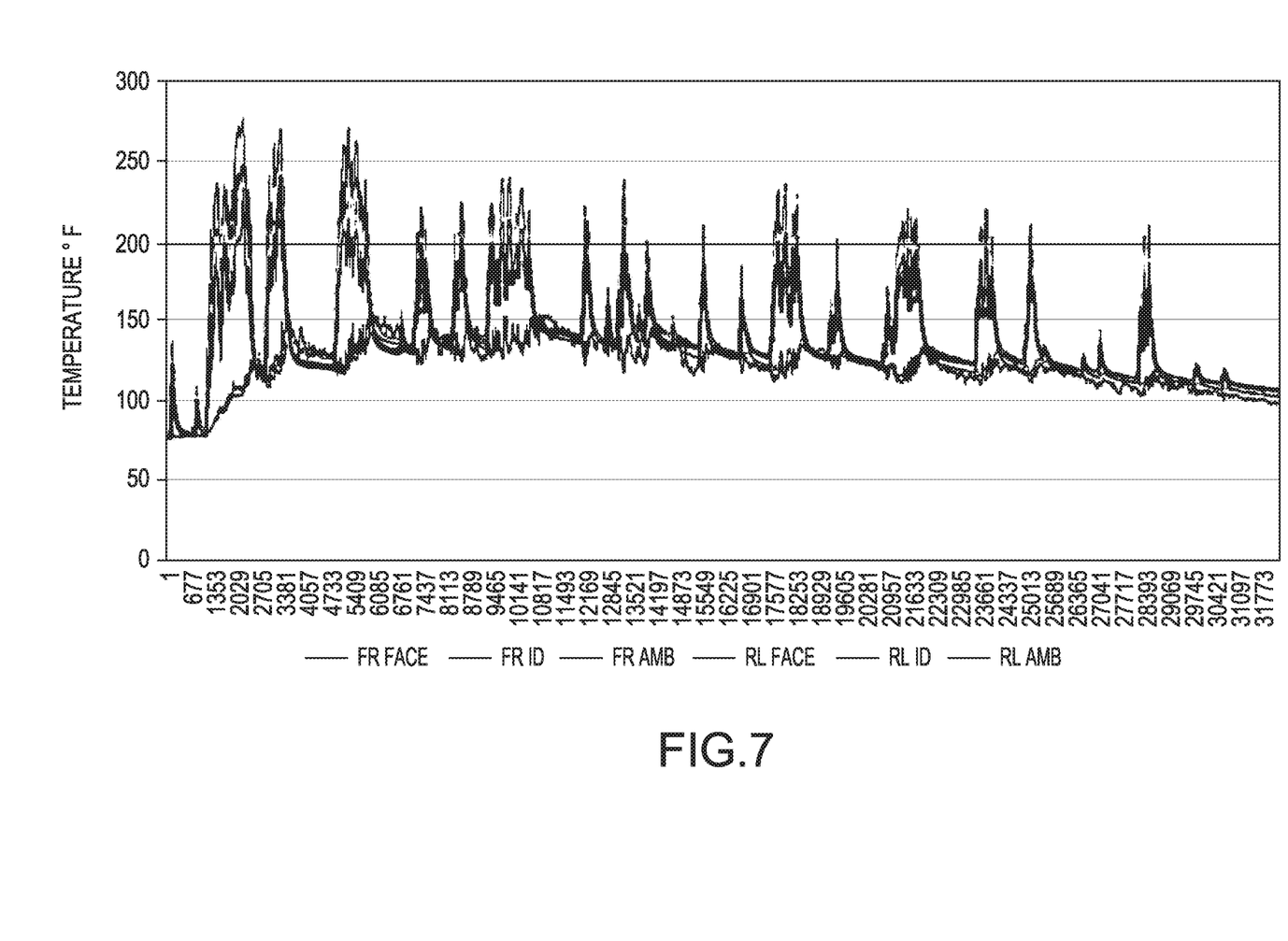
FIG. 7 is a graph showing the temperatures of various portions of the conventional seal of FIG. 1 mounted at front left and rear right locations on a vehicle.

As will be seen from a comparison of the data of FIGS. 6 and 7, the maximum and average temperatures reached by the novel seal 32 (FIG. 6) were generally lower than the maximum and average temperatures of the conventional seal (FIG. 7) under substantially identical operating conditions on the same vehicle. For example, the temperature of the novel seal did not exceed 200 degrees F. as often as the conventional seal. Because the novel seal 30 reduces operating temperature, it is expected that the seal 30 will have a longer useful life than the conventional seal because the HBNR compound from which the seal 30 is formed will degrades more slowly at lower operating temperatures.

The present invention has been disclosed herein in terms of a presently preferred embodiment. However, modifications and additions to these embodiments will become apparent to persons of ordinary skill in the art upon a reading of the foregoing description. It is intended that all such modifications and additions be included within the present invention to the extent they fall within the scope of the several claims appended hereto.

What is claimed is:

1. A seal body comprising:
an elastomeric body; and
a support at least partially embedded in the elastomeric body;
the elastomeric body including:
a substantially cylindrical first portion having an axial inner end and an axial outer end,
a first flange having a radially outer end at the axial outer end of the first portion and having a radially inner end, and having an axially inner wall portion extending radially outwardly from the radially inner end of the first flange, the first flange extending radially inward from the axial outer end of the first portion,
a second flange having an axial outer end at the radial inner end of the first flange and an axially inner end axially inside the first portion; and
the support including:
a substantially cylindrical first portion at least partially embedded in the first portion of the elastomeric body and a second portion at least partially embedded in the first flange of the elastomeric body;
wherein the second flange includes radially outer wall having an annular groove configured to receive a garter spring and an radially inner surface;
the radially inner surface comprising an axially outer conical portion having a radially outer end and a radially inner end and an axially inner conical portion, the axially outer conical portion meeting the axially inner conical portion at a lip, the lip being configured to form a sliding seal with an adjacent surface,
wherein, in radial section, the seal body includes a first virtual plane including the radially outer wall of the second flange, a second virtual plane parallel to the first virtual plane and including the lip, a third virtual plane parallel to the second virtual plane touching but not intersecting the groove, and a fourth virtual plane including the axially inner wall portion, wherein a flex thickness is defined as a minimum distance from the first virtual plane to the third virtual plane and a head thickness is defined as a maximum distance from the second virtual plane to the third virtual plane, and wherein an inner angle is defined between the axially inner conical portion and the second virtual plane and an outer angle is defined between the axially outer conical portion and the second virtual plane, wherein a head height is defined as a minimum radial distance from the fourth virtual plane to the lip, and wherein a ratio of the flex thickness to the head thickness is about 44%.

2. The seal body according to claim 1, wherein no portion of the support is embedded in the second flange.

3. The seal body according to claim 1, wherein the fourth virtual plane intersects the radially outer end of the axially outer conical portion.

4. The seal body according to claim 1, wherein a ratio of the head thickness to the head height is about 46%.

5. The seal body according to claim 1, wherein a ratio of the flex thickness to the head height is about 20%.

6. The seal body according to claim 5 wherein a ratio of the head thickness to the head height is about 46%.

7. The seal body according to claim 1, wherein a ratio of the outer angle to the inner angle is about 54% to 58%.

8. The seal body according to claim 1, wherein the ratio of the head thickness to the head height is about 46%, wherein the ratio of the flex thickness to the head height is about 20%, and wherein the ratio of the outer angle to the inner angle is about 54% to 58%.

9. The seal body according to claim 3, wherein the ratio of the head thickness to the head height is about 46%, wherein the ratio of the flex thickness to the head height is about 20%, and wherein the ratio of the outer angle to the inner angle is about 54% to 58%.

10. A seal body comprising:
an elastomeric body; and
a support at least partially embedded in the elastomeric body;
the elastomeric body including:
a substantially cylindrical first portion having an axial inner end and an axial outer end,
a first flange having a radially outer end at the axial outer end of the first portion and having a radially inner end, and having an axially inner wall portion extending radially outwardly from the radially inner end of the first flange, the first flange extending radially inward from the axial outer end of the first portion, and
a second flange having an axial outer end at the radial inner end of the first flange and an axially inner end axially inside the first portion; and
the support including:
a substantially cylindrical first portion at least partially embedded in the first portion of the elastomeric body and a second portion at least partially embedded in the first flange of the elastomeric body;
wherein the second flange includes radially outer wall having an annular groove configured to receive a garter spring and an radially inner surface;
the radially inner surface comprising an axially outer conical portion having a radially outer end and a radially inner end and an axially inner conical portion, the axially outer conical portion meeting the axially inner conical portion at a lip, the lip being configured to form a sliding seal with an adjacent surface, wherein, in radial section, the seal body includes a first virtual plane including the radially outer wall of the second flange, a second virtual plane parallel to the first virtual plane and including the lip, a third virtual plane parallel to the second virtual plane touching but not intersecting the groove, and a fourth virtual plane including the axially inner wall portion, wherein a flex thickness is defined as a minimum distance from the first virtual plane to the third virtual plane and a head thickness is defined as a maximum distance from the second virtual plane to the third virtual plane, and wherein an inner angle is defined between the axially inner conical portion and the second virtual plane and an outer angle is defined between the axially outer conical portion and the second virtual plane, wherein a head height is defined as a minimum radial distance from the fourth virtual plane to the lip, and wherein a ratio of the head thickness to the head height is about 46%.

11. The seal body according to claim 10, wherein the fourth virtual plane intersects the radially outer end of the axially outer conical portion.

12. The seal body according to claim 10, wherein a ratio of the flex thickness to the head height is about 20%.

13. The seal body according to claim 10, wherein a ratio of the outer angle to the inner angle is about 54% to 58%.

14. The seal body according to claim 10, wherein a ratio of the flex thickness to the head thickness is about 44%, wherein the ratio of the flex thickness to the head height is about 20%, and wherein the ratio of the outer angle to the inner angle is about 54% to 58%.

15. The seal body according to claim 11, wherein a ratio of the flex thickness to the head thickness is about 44%, wherein the ratio of the flex thickness to the head height is about 20%, and wherein the ratio of the outer angle to the inner angle is about 54% to 58%.

16. A seal body comprising:
an elastomeric body; and
a support at least partially embedded in the elastomeric body;
the elastomeric body including:
a substantially cylindrical first portion having an axial inner end and an axial outer end,
a first flange having a radially outer end at the axial outer end of the first portion and having a radially inner end, and having an axially inner wall portion extending radially outwardly from the radially inner end of the first flange, the first flange extending radially inward from the axial outer end of the first portion, and
a second flange having an axial outer end at the radial inner end of the first flange and an axially inner end axially inside the first portion; and
the support including:
a substantially cylindrical first portion at least partially embedded in the first portion of the elastomeric body and a second portion at least partially embedded in the first flange of the elastomeric body, wherein no portion of the support is embedded in the second flange;
wherein the second flange includes radially outer wall having an annular groove configured to receive a garter spring and an radially inner surface;
the radially inner surface comprising an axially outer conical portion having a radially outer end and a radially inner end and an axially inner conical portion, the axially outer conical portion meeting the axially inner conical portion at a lip, the lip being configured to form a sliding seal with an adjacent surface, wherein, in radial section, the seal body includes a first virtual plane including the radially outer wall of the second flange, a second virtual plane parallel to the first virtual plane and including the lip, a third virtual plane parallel to the second virtual plane touching but not intersecting the groove, and a fourth virtual plane including the axially inner wall portion, wherein a flex thickness is defined as a minimum distance from the first virtual plane to the third virtual plane and a head thickness is defined as a maximum distance from the second virtual plane to the third virtual plane, and wherein an inner angle is defined between the axially inner conical portion and the second virtual plane and an outer angle is defined between the axially outer conical portion and the second virtual plane, wherein a head height is defined as a minimum radial distance from the fourth virtual plane to the lip, wherein the fourth virtual plane intersects the radially outer end of the axially outer conical portion wherein a ratio of the flex thickness to the head thickness is about 42% to 46%, and wherein a ratio of the head thickness to the head height is about 44% to 48%.

17. The seal body according to claim 16, wherein a ratio of the outer angle and the inner angle is about 54% to 58%.

18. The seal body according to claim 16, wherein the ratio of flex thickness to head thickness is about 44% and the ratio of head thickness to head height is about 46% and a ratio of the outer angle to the inner angle is about 56%.

* * * * *